United States Patent Office 3,311,578
Patented Mar. 28, 1967

3,311,578
PROCESS FOR PREPARING IMPROVED HIGHLY POLYMERIC CRYSTALLINE THERMOPLASTIC POLYESTERS
Thomas M. Laakso, Rochester, N.Y., assignor to Eastman Kodak Company, Rochester, N.Y., a corporation of New Jersey
No Drawing. Filed May 4, 1964, Ser. No. 364,772
8 Claims. (Cl. 260—22)

This invention relates to highly polymeric, crystalline thermoplastic polyesters, i.e. both homopolyesters and copolyesters, which are characterized by having relatively wide spreads on their melting and recrystallization temperatures and having the ability to remain tacky for substantial periods after being heated to their melting temperatures, and relates particularly to a novel process for preparing these advantageously unique polyesters.

It is known that useful high molecular weight polyesters can be prepared by direct reaction of free polycarboxylic acids and polyols. While this esterification will take place even in the absence of catalysts, the reaction under such condition requires an impractically long time for completion, e.g. from about 16 to 18 hours or more. Accordingly, to shorten the reaction period various catalysts have been proposed. However, since the reaction splits off water instead of the alcohols of those conventional methods wherein bis-esters are employed, not all esterification catalysts are satisfactorily operable. For example, well known ester-exchange catalysts such as represented by titanium isopropoxide are ineffective in the presence of water. On the other hand, catalysts which are operable in this reaction such as, for example, p-toluenesulfonic acid have a number of serious shortcomings such as a tendency to discolor the products, difficulty in obtaining products of low acid value and poor stability of the products in the presence of moisture and at elevated temperatures. Various compounds of a number of different metals, such as oxides of tin, have also been proposed as catalysts for the preparation of polyesters from free polycarboxylic acids and polyols. While some improvement in color of the products has been noted with some catalysts of this type, such products have not proven entirely satisfactory from the standpoint of color or with regard to other considerations relevant to the more critical applications for the polyesters being produced. Such critical applications which require essentially color free polymers include, for example, the preparation of thermographic materials. Also, such prior art processes have not been especially adapted so as to most advantageously provide polyesters and copolyesters with physical properties such as having a purposely desirable spread in melting and recrystallization temperatures and at the same time having the ability to remain tacky on melting for substantial periods of time.

I have now found that highly polymeric, crystalline thermoplastic polyesters i.e. homopolyesters and copolyesters that are not only essentially color free, but also of improved crystallization properties, of narrower molecular weight distribution and of better controlled viscosities as compared with related products proposed heretofore, and which are especially adapted for the preparation of thermographic materials can be prepared by first reacting the free polycarboxylic acids with appropriate polyols in the presence of a basic inorganic compound which is essentially composed of strontium oxide to split off the water that forms in the reaction, and, when all this first-stage water has been removed at about atmospheric pressure, then adding an ester-exchange catalyst such as titanium isopropoxide and continuing the reaction under greatly reduced pressures until the molecular weight of the polymers have been built up to the desired point and other desired characteristics have been achieved by removal of excess polyols. I have further found that other alkaline earth oxides such as magnesium oxide and calcium oxide, when used in place of strontium oxide in my process, do not produce satisfactory polyesters for thermographic materials. For one thing, they give polyester products considerably more colored than those with strontium oxide.

It is, accordingly, an object of the invention to provide a new and improved polyester having a relatively wide spread in its melting and recrystallization temperature range and being capable of remaining tacky for substantial periods after being brought to its melting point temperature range and then allowed to cool. Another object is to provide new and improved homopolyesters and copolyesters that are particularly useful in thermographic processes. Another object is to provide a novel process for preparing these homopolyesters and copolyesters. Other objects will become apparent from the description and examples.

In accordance with the invention, I prepare the new and improved highly polymeric, crystalline thermoplastic polyesters by a two-stage process which comprises (1) first heating at about from 190° C. to 250° C., a mixture comprising (A) a bifunctional dicarboxylic acid (2–40 carbons), preferably having the general structure:

(I) $$\text{HOOC—R—COOH}$$

wherein R represents a direct C to C bond (as in oxalic acid), a branched or straight chain alkylene group of 1–38 carbon atoms, e.g. $-C_2H_4-$, $-C_3H_6-$, $-C_4H_8-$, $-C_{18}H_{36}-$, $-C_{34}H_{68}-$, etc., a cycloalkylene group of from 5–6 carbon atoms, e.g. $-C_5H_8-$ or $-C_6H_{10}-$, or an arylene group of 6–8 carbon atoms, e.g. phenylene, tolylene, etc., or other closely related acids such as a dimer of linoleic acid, with (B) a slight excess, i.e. in proportions of up to about 3–5% greater than one mole per mole of the acid used, of a bifunctional dihydroxy compound (2–20 carbons) preferably having the general structure:

(II) $$\text{HO—R}_1\text{—OH}$$

wherein $R_1$ represents a branched or straight chain alkylene group of 2–20 carbon atoms or a cycloalkylene group of the structure:

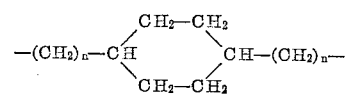

wherein $n$ is an integer of 1–3, in the presence of strontium oxide in an amount of up to about 1% based on the total weight of the acid and the dihydroxy compound, until essentially all of the water which forms in the reaction at about atmospheric pressure has been removed, and (2) then adding another catalyst, preferably titanium isopropoxide (or other 1–8 carbon alkoxide), and continuing to heat under greatly reduced pressure for a period sufficient to build up the molecular weight of the polymer to the desired point along with the achievement of other desired physical characteristics. The excess of the dihydroxy compound is removed in this second stage. Either the acids or anhydrides, where anhydrides exist, can be used. The term "acid" as used herein, therefore, is intended to include both the acid and the anhydride thereof. The reaction can be carried out in batch, continuous or semi-continuous manners. The first-stage (1) esterification can be carried out advantageously under an inert atmosphere, for example, under nitrogen which also can be used to sweep out any residual water on completion of the first-stage reaction. If desired, the reaction can also be carried out in the presence of an inert diluent which may be selected to provide a constant boiling mixture with the evolved water so as to facilitate its removal, for example, xylene or toluene. In the second-stage reaction, the pressure is advantageously maintained at less than 0.5 mm. and preferably less than 0.1 mm. The catalysts may be used with advantage in the amounts of about 0.001 to about 1 percent, based on the weight of the overall esterifiable mixture. The final product may be further treated, if desired, by extraction, washing, etc. with appropriate nonsolvents, or by filtering with an appropriate filter aid. These homopolyesters exhibit a spread of about 3–5° C. in their melting and recrystallization temperatures. As previously indicated, the final polyester products are all crystalline in character as determined by the conventional X-ray diffraction technique.

For the preparation of the new preferred class of crystalline copolyesters, a part of the principal acid of above structure I is replaced in the above reaction with a different modifying bifunctional dicarboxylic acid in an amount up to 40 mole percent, and preferably from about 10–35 mole percent. These products exhibit a somewhat wider spread in their melting and recrystallization temperatures, e.g. reaching in some cases to a spread of about 20° C. This together with their other desirable properties make the copolyesters particularly efficacious polymers for thermographic materials.

Suitable bifunctional dicarboxylic acids of above structure I include malonic, dimethylmalonic, succinic, glutaric, adipic, pimelic, suberic, α-ethylsuberic, azelaic, sebacic, 1,4-cyclohexanedicarboxylic, 1,3-cyclohexanedicarboxylic, phthalic, isophthalic, terephthalic, etc. acids.

The modifying bifunctional dicarboxylic acid which can be used to replace up to 40 mole percent of the main acid can be selected from the above bis-acids or from acids such as dicarboxy diethyl ether or sulfonyl dipropionic acid, p,p'-sulfonyldibenzoic acid, 4,4'-diphenic acid, 4,4'-benzophenonedicarboxylic acid, di(p-carboxyphenyl) alkanes (1–10 carbons), etc., a dimer of stearic acid, etc.

Suitable bifunctional dihydroxy compounds of above structure II include ethylene glycol, propylene glycol, 1,3-butanediol, 1,4-butanediol, 1,5-pentanediol, 1,2-pentanediol, neopentyl glycol, hexamethylene glycol, decamethylene glycol, dodecamethylene glycol, 2,2,4-trimethylpentanediol, 2-ethyl-1,3-hexanediol, 2-methyl-2-propyl-1,3-propanediol, 2-ethyl-2-butyl-1,3-propanediol, 2,2-diethylpropanediol, 2-isobutyl-2-ethyl-1,3-propanediol, 1,4-cyclohexanedimethanol, 1,3 - cyclohexanedimethanol, 2,2,4,4-tetra-alkyl-1,3-cyclobutanediols such as 2,2,4,4-tetramethyl-1,3-cyclobutanediol, and the like glycols.

The following examples will serve further to illustrate the process and crystalline, thermoplastic polyesters of the invention.

EXAMPLE 1

*Poly(75 mole percent 1,4-cyclohexanedimethylene adipate—25 mole percent 1,4-cyclohexanedimethylene azelate)*

Three hundred and two and four-tenth grams (2.1 moles) of 1,4-cyclohexanedimethanol, 219 g. (1.5 mole) adipic acid, 94 g. (0.5 mole) of azelaic acid, and 0.1 g. of strontium oxide are placed in a polymerization flask and heated in an electrically-heated silicone-oil bath at 235° C. in a nitrogen atmosphere for three hours, under a short air condenser equipped with a straight still-head. At the end of this time any residual water is flushed out with nitrogen. This completes the first stage. Then, for the second stage, 3 drops of titanium isopropoxide are added to the reaction mixture and the flask is equipped with a vacuum-tight stainless-steel stirrer system driven by an electric motor. The flask is then placed under reduced pressure (0.08 mm. of mercury) supplied by a high vacuum pump protected by a series of receivers and traps immersed in Dry-Ice acetone baths. Continuing to heat with good stirring, a light-colored polymer was obtained in 30 minutes reaction time which had a melting point range of 82–94° C. (spread of 12° C.), and an intrinsic viscosity of about 0.63 as measured at 25° C. in a 1:1 phenol-chlorobenzene solution containing 0.25 g. per 100 cc. of the polymer.

This polymer showed excellent thermographic properties remaining in tacky condition after activation, i.e. exposure to an image, in the image areas for sufficient time to allow making 15–20 well defined copies by transfer of the tacky image areas to appropriate receiving surfaces such as paper. Duplicate runs of this example, gave products in one case with a melting point spread of 82–90° C., and in another case with a melting point spread of 82–93° C. These likewise showed excellent thermographic properties.

By varying the ratios of the adipic acid and the azelaic acid in the above example, there may be obtained other copolyesters wherein the azelate component can vary from 10–40 mole percent and the adipate component can vary from 90–60 mole percent, which have generally similar physical constants and thermographic properties.

EXAMPLE 2

*Poly(neopentyl succinate)*

Materials: G.
  Neopentyl glycol _____(2.2 moles)__ 230
  Succinic acid _____(2.0 moles)__ 236
  Strontium oxide _____ 0.1

The above materials were reacted for three hours in the first stage, as in Example 1. Three drops of titanium isopropoxide were then added and the second stage conducted for two hours, as in Example 1.

The polyester product was a light-amber colored polymer having an intrinsic viscosity of 1.04 (measured in 1:1 phenol-chlorobenzene). A 95 percent yield was obtained of poly(neopentyl succinate) M.P. range about 70–85° C. By a fractionation procedure, this polymer was shown to have very little of a lower-molecular-weight fraction. It had thermographic properties.

EXAMPLE 3

*Poly(85 mole percent 1,4-cyclohexanedimethylene succinate—15 mole percent 1,4-cyclohexanedimethylene sebacate)*

Materials: G.
  1,4-cyclohexanedimethanol ____(2.2 moles)__ 316.8
  Succinic acid _____(1.7 moles)__ 170.0
  Sebacic acid _____(0.3 mole)__ 60.6
  Strontium oxide _____ 0.1

The above materials were reacted for three hours in the first stage as in Example 1. Three drops of titanium isopropoxide were then added and the second stage conducted for 17 minutes as in Example 1.

The light-colored copolyester product had an intrinsic viscosity of 0.23 (as measured in ethylene chloride). Better than 95 percent yield of copolymer having a melting point range of about 99–110° C. was obtained. This copolyester showed excellent thermographic properties.

By varying the ratios of the succinic acid and the sebacic acid in the above example, there may be obtained other copolyesters wherein the sebacate component can vary from 10–40 mole percent and the succinate component can vary from 90–60 mole percent. These copolyesters likewise have generally similar physical constants and thermographic utility.

EXAMPLE 4

*Poly(85 mole percent 1,4-cyclohexanedimethylene succinate—15 mole percent 1,4-cyclohexanedimethylene dimer acids esters)*

Materials: G.
1,4-cyclohexanedimethanol ___(0.44 mole)__ 62.36
Succinic anhydride _____(0.34 mole)__ 34.00
Empol 1014 _____(0.06 mole)__ 36.00
Strontium oxide _____ 0.01

The above materials were reacted for three hours as in Example 1. One drop of titanium isopropoxide was added and the second stage conducted for one hour.

The very light-amber colored copolyester product had a viscosity of 0.211 (as measured in ethylene chloride). Better than 94 percent yield of copolymer was obtained, M.P. range 82–100° C. This product had excellent thermographic properties. Empol-1014 employed in this example is the trade name for a species of dimer acids obtained by Diels-Alder reaction of drying oil acids (Emery Industries, Inc.), i.e. a $C_{36}$ dibasic dimer acid derived from the dimerization of linoleic acid or the like.

Other related copolyesters can be prepared by varying the ratios of the succinic anhydride and the dimer acid (Empol-1014) in the above example. Thus, copolyesters containing 10–40 mole percent of the dimer acid component and 90–60 mole percent of the succinate component can be readily prepared. These likewise have wide spreads in their melting points and exhibit good thermographic properties.

EXAMPLE 5

*Poly(pentamethylene terephthalate)*

Materials: G.
Pentamethylene glycol _____(0.2 mole)__ 20.8
Terephthalic acid _____(0.1 mole)__ 16.6
Strontium oxide _____ 0.01

The above materials were reacted for twelve hours in the first stage, as in Example 1. One drop of titanium isopropoxide was then added to the homogenous melt and the second stage conducted for four hours as Example 1.

The light-amber colored product had an intrinsic viscosity of 0.39 (as measured in 1:1 phenol:chlorobenzene). Better than 90 percent yield of polymer was obtained, which had a melting point range of about 136–139° C. and showed thermographic characteristics.

EXAMPLE 6

This example illustrates the use of the crystalline polyesters of the invention as thermographic materials.

A heat-sensitive element for use in a transfer process was prepared as follows: 8.6 g. of a 25% solution of sodium sulfate in water was stirred into 100 g. of a 5% solution of polyvinyl alcohol (an 87% hydrolyzed polyvinyl acetate) in water which contained 0.1 g. of a surfactant, Aerosol OT (a dioctyl sodium sulfosuccinate). 1.8 g. of zinc oxide was dispersed in the resulting solution using a food blender. After the dispersion had defoamed, it was coated over a dyed heat-sensitive layer on a support of map overlay paper. The heat-sensitive layer comprised a 1.5 g./ft.$^2$ coating of 85 parts of crystalline copolyester (prepared according to Example 1), 5 parts of polyethyl acrylate, and 10 parts of Azo Oil Blue Black B dye. The overcoating coverage was approximately 0.5 g./ft.$^2$. During application and drying of the overcoating, the coating block was maintained at 40° C. After drying, the resulting matrix was annealed for 1 hour at 75° C.

The resulting thermographic matrix was placed in contact with a standard lithographic document and the 2-ply assembly was then exposed in a commercially available thermographic machine set for normal exposure and then separated. The tacky image areas were transferred to a receiving sheet of stationery. Ten high quality transfers were metered to receiving papers from the exposed matrix. The transfers were made at a rate of 0.172 in./sec. using transfer rolls which were maintained at a temperature of 70–75° C. and were loaded at 52 pounds per lineal inch.

It will be apparent that other crystalline homopolyesters and copolyesters prepared according to the process of the invention as illustrated by above Examples 1–5 can be substituted in above Example 6 to give similar good transfer reproductions of documents and other image materials that are to be reproduced. For further details concerning the thermographic utility of these crystalline polyesters, reference may be had to copending application of Dulmage et al., Ser. No. 211,927, filed June 27, 1962, now U.S. Patent 3,260,612, wherein thermographic elements employing such crystalline polyesters are described and claimed.

This invention has been described in detail with particular reference to preferred embodiments thereof, but it will be understood that variations and modifications can be effected within the spirit and scope of the invention as described hereinabove and as defined in the appended claims.

What I claim is:

1. A process for preparing highly polymeric, crystalline polyesters that are characterized by having relatively wide spreads in their melting and recrystallization temperatures and having the ability to remain tacky for substantial periods after being heated to their melting temperatures, which comprises the steps (1) heating at about atmospheric pressure a bifunctional dicarboxylic acid of 2–40 carbon atoms with a bifunctional dihydroxy compound of 2–20 carbon atoms, in the proportions of substantially greater than 1 mole of the said dihydroxy compound per mole of the said acid, at about 190–250° C., in the presence of strontium oxide in an amount of up to about 1% based on the total weight of said acid and said dihydroxy compound, until substantially all of the water that can be formed in the reaction at about atmospheric pressure has been removed, and (2) adding a titanium alkoxide in an amount of up to about 1% based on the total weight of said acid and said dihydroxy compound, each alkoxide group of said titanium alkoxide having 1–8 carbon atoms, and continuing heating the reaction mixture under high vacuum until the said polyester product has formed.

2. The process according to claim 1 wherein said dicarboxylic acid contains from about 4–12 carbon atoms and from 10–40 mole percent of the said dicarboxylic acid is replaced with a different modifying bifunctional dicarboxylic acid of 2–40 carbon atoms.

3. The process according to claim 1 wherein the said dicarboxylic acid is succinic acid and wherein the said dihydroxy compound is neopentyl glycol.

4. The process according to claim 1 wherein the said dicarboxylic acid is terephthalic acid and the said dihydroxy compound is pentamethylene glycol.

5. The process according to claim 2 wherein the said dicarboxylic acid is adipic acid, wherein the said modifying dicarboxylic acid is azelaic acid, and wherein the said dihydroxy compound is 1,4-cyclohexanedimethanol.

6. The process according to claim 5 wherein the said acids are present in the proportions of about 15–35 mole percent of the azelaic acid and about 85–65 mole percent of the adipic acid.

7. The process according to claim 2 wherein the said dicarboxylic acid is succinic acid and the said modifying acid is sebacic acid, and wherein the said dihydroxy compound is cyclohexanedimethanol.

8. The process according to claim 2 wherein the said dicarboxylic acid is succinic acid and the said modifying dicarboxylic acid is a linoleic acid dimer, and wherein the said dihydroxy compound is cyclohexanedimethanol.

References Cited by the Examiner

UNITED STATES PATENTS

| | | | |
|---|---|---|---|
| 2,465,319 | 3/1949 | Whinfield et al. | 260—75 |
| 2,634,278 | 4/1953 | Kuhut | 260—410.7 |
| 2,822,348 | 2/1958 | Haslam | 260—75 |
| 3,057,824 | 10/1962 | Le Bras et al. | 260—75 |
| 3,117,950 | 1/1964 | Kibler et al. | 260—75 |

LEON J. BERCOVITZ, *Primary Examiner.*

R. W. GRIFFIN, *Assistant Examiner.*